United States Patent
Gong et al.

(10) Patent No.: US 11,328,385 B2
(45) Date of Patent: May 10, 2022

(54) AUTOMATIC IMAGE WARPING FOR WARPED IMAGE GENERATION

(71) Applicant: Adobe Inc., San Jose, CA (US)

(72) Inventors: Julia Gong, Cary, NC (US); Yannick Hold-Geoffroy, San Jose, CA (US); Jingwan Lu, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/848,741

(22) Filed: Apr. 14, 2020

(65) Prior Publication Data

US 2021/0319532 A1 Oct. 14, 2021

(51) Int. Cl.
*G06T 3/00* (2006.01)
*G06T 7/00* (2017.01)
*G06T 11/60* (2006.01)

(52) U.S. Cl.
CPC .......... *G06T 3/0093* (2013.01); *G06T 7/0002* (2013.01); *G06T 11/60* (2013.01); *G06T 2207/20081* (2013.01); *G06T 2207/20084* (2013.01); *G06T 2207/30168* (2013.01)

(58) Field of Classification Search
CPC ....... G06T 3/00; G06T 3/0093; G06T 7/0002; G06T 11/60; G06T 2207/20081; G06T 2207/20084; G06T 2207/30168
See application file for complete search history.

(56) References Cited

U.S. PATENT DOCUMENTS

2005/0212821 A1* 9/2005 Xu .......................... G06T 11/00
                                                                345/647
2016/0011769 A1* 1/2016 Zou ..................... G06F 3/04845
                                                                715/863

OTHER PUBLICATIONS

Han, Xiaoguang, et al. "Caricatureshop: Personalized and photorealistic caricature sketching." IEEE transactions on visualization and computer graphics 26.7 (2018): 2349-2361 (Year: 2018).*

(Continued)

*Primary Examiner* — Diane M Wills
(74) *Attorney, Agent, or Firm* — Nicholson De Vos Webster & Elliott LLP

(57) ABSTRACT

Techniques and systems are provided for configuring neural networks to perform warping of an object represented in an image to create a caricature of the object. For instance, in response to obtaining an image of an object, a warped image generator generates a warping field using the image as input. The warping field is generated using a model trained with pairings of training images and known warped images using supervised learning techniques and one or more losses. The warped image generator determines, based on the warping field, a set of displacements associated with pixels of the input image. These displacements indicate pixel displacement directions for the pixels of the input image. These displacements are applied to the digital image to generate a warped image of the object.

20 Claims, 9 Drawing Sheets

(56) References Cited

OTHER PUBLICATIONS

Jaderberg et al., "Spatial Transformer Networks", Google DeepMind, London, UK, 2015 (Year: 2015).*
Liu et al., "Semi-Supervised Learning in Reconstructed Manifold Space for 3D Caricature Generation", Computer Graphics Forum, 2009 (Year: 2009).*
Tome, Denis, et al. "XR-egopose: Egocentric 3d human pose from an hmd camera." Proceedings of the IEEE/CVF International Conference on Computer Vision. 2019 (Year: 2019).*
Zhang et al., "Data-Driven Synthesis of Cartoon Faces Using Different Styles", IEE Transactions on Image Processing, Jan. 2017 (Year: 2017).*

* cited by examiner

800

```
OBTAIN A DIGITAL IMAGE, WHEREIN THE DIGITAL IMAGE IS OF AN OBJECT
802
```

```
GENERATE A WARPING FIELD USING A TRAINED MODEL WITH THE DIGITAL IMAGE AS
INPUT, THE TRAINED MODEL BEING TRAINED TO GENERATE ONE OR MORE WARPING
FIELDS WITH PAIRINGS OF TRAINING IMAGES AND KNOWN WARPED IMAGES USING
SUPERVISED LEARNING TECHNIQUES AND ONE OR MORE LOSSES
804
```

```
DETERMINE, USING THE WARPING FIELD, A SET OF DISPLACEMENTS ASSOCIATED
WITH PIXELS OF THE DIGITAL IMAGE, THE SET OF DISPLACEMENTS INDICATING PIXEL
DISPLACEMENT DIRECTIONS FOR THE PIXELS OF THE DIGITAL IMAGE
806
```

```
APPLY THE SET OF DISPLACEMENTS TO THE DIGITAL IMAGE TO GENERATE A WARPED
IMAGE OF THE OBJECT
808
```

FIG. 8

AUTOMATIC IMAGE WARPING FOR WARPED IMAGE GENERATION

FIELD

This application is generally related to automatically configuring machine learning models to generate warped images. For example, aspects of this application relate to configuring systems to generate warping fields that are used to manipulate digital images in order to create warped images of objects within the digital images.

BACKGROUND

Caricatures are often used to amplify the distinctive, yet often nuanced traits of objects (e.g., human faces, animals, and/or other objects). The creation of caricatures is traditionally performed by artists, as it is difficult to capture an object's unique characteristics using automated methods. For instance, while most people are able to identify faces familiar to them, it often requires the more trained eye of a caricature artist to identify the most distinctive features of a person that characterize the person's face. Caricatures are a specific form of portraiture in which artists exaggerate the most visually salient characteristics of their subjects that distinguish these subjects from others. Amplifying these defining features allows artists to create more distilled portrayals of their subjects. Indeed, the skillful exaggeration of a subject's features via caricature often allows viewers to identify a subject's identity more easily than from a normal photograph or other realistic image of the subject.

With the advent of computer vision techniques for performing creative tasks, the desire to automatically generate caricatures from digital images of human faces has grown. Similar to how an artist might approach caricatures, computer vision techniques are used to decompose caricature generation into two operations: modifying a digital representation of a human face that exaggerates salient features of the face, and stylizing the warped image for an artistic effect. These two operations are typically performed together. However, as noted above, performing these operations together often does not precisely target the most salient features and/or results in weaker warping and less flexibility for combining different warps and styles. While there has been substantial progress in the stylization component of caricature generation, modifying a digital representation of an object (e.g., by applying a geometric warp to a digital representation of a human face in an image) in order to generate high quality caricatures has proven difficult. Indeed, there is less margin for error in pure geometric warping. For example, not only are viewers highly attuned to detect faces, viewers are also more sensitive to the quality of unstylized, warped faces than that of stylized caricatures, since the resulting images are photorealistic.

Techniques and systems are needed to provide a solution that is usable to automatically configure machine learning models to yield high quality geometric warps that are usable to create warped images, such as caricatures, from digital images of objects.

SUMMARY

Machine learning systems and related techniques are described herein that perform warping of images to generate warped images (e.g., caricatures) using an automated machine learning approach. For instance, in response to obtaining a digital image that includes a digital representation of an object, a warped image generator detects one or more features of the object from the digital image. Further, the warped image generator generates a warping field using this digital image. The warping field is generated based on the detected features and using a machine learning model trained with pairings of training images and known warped images. The warped image generator applies the warping field to the digital image to generate a warped digital image that serves as a caricature of the object. In some examples, the warped digital image is used as input to a stylization network to generate a new image that includes a stylized caricature of the object depicted in the original image. The stylization network is a separate neural network from a neural network of the warped image generator. For instance, the stylization network and the warped image generator are trained separately.

Additional features and advantages of the present application will be set forth in the description which follows, and in part will be obvious from the description, or are learned by the practice of the examples provided herein.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments are described in detail below with reference to the following figures.

FIG. 8 shows an illustrative example of a process for generating warped images in accordance with at least one embodiment.

DETAILED DESCRIPTION

Figure 1:
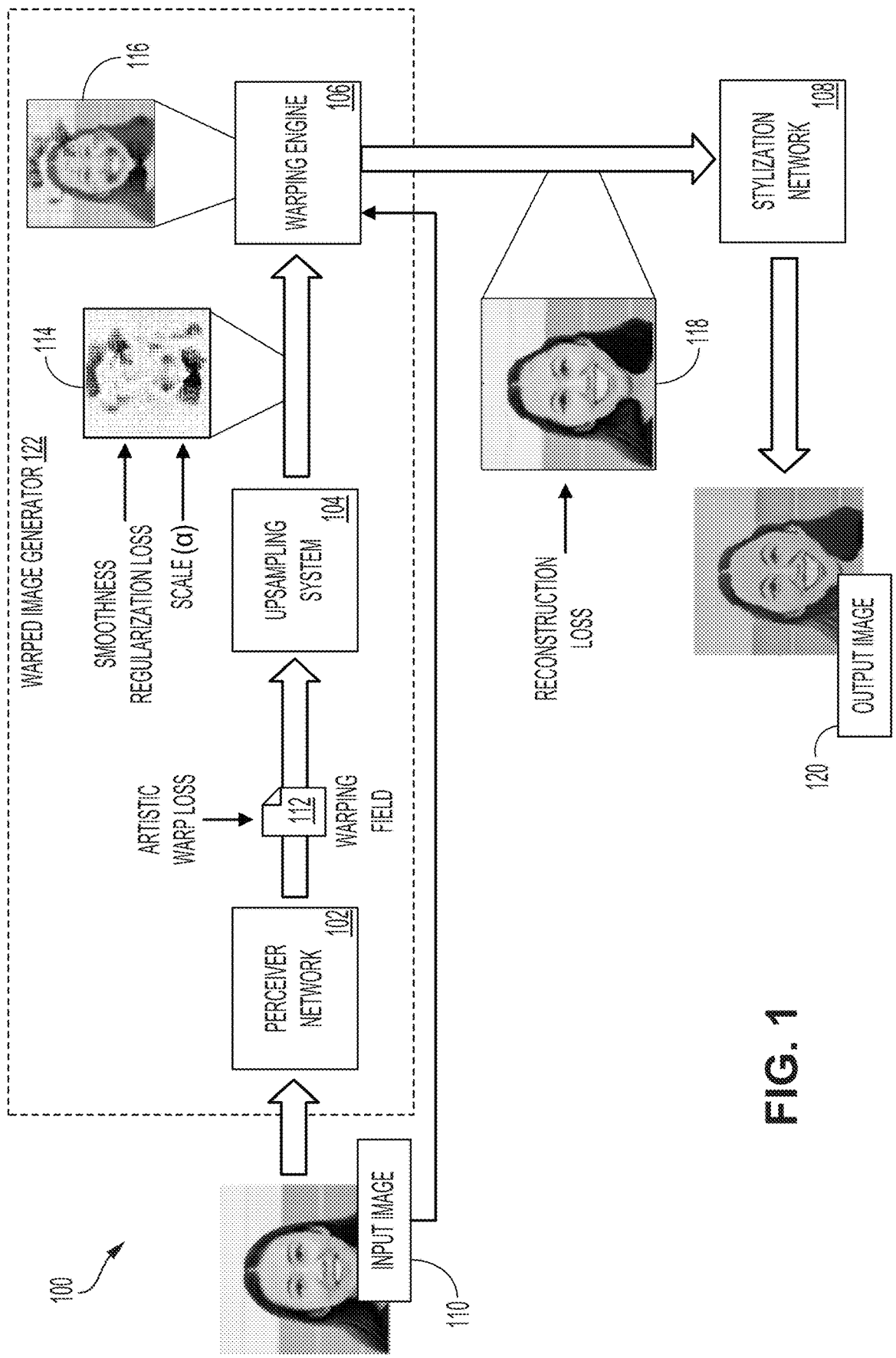
FIG. 1 shows an illustrative example of an environment in which a warping engine of a warped image generator modifies an input image using a warping field to generate a warped image in accordance with at least one embodiment.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A caricature is a work of art used to amplify the most salient features of an object, such as a human face. Modifying a digital representation of an object in an automated manner to generate high quality caricatures is a difficult task. For example, it is difficult to apply a geometric warp to a digital representation of a human face in an image to generate a caricature of the face. In some cases, failing to properly perform geometric warping of an image results in a warping that does not precisely target the salient features of the face in the image.

Several deep learning approaches have previously been implemented in order to generate caricatures from an original image. For instance, CariGAN is a deep learning approach used to generate caricatures. CariGAN trains a Generative Adversarial Network (GAN) using unpaired images to learn an image-to-caricature translation. In general, unpaired image-to-image translation converts an image from one domain to another domain, without providing paired example images for the training. Once trained, the GAN of CariGAN translates an input image to a caricature. Building on previous methods related to style transfer and learned warping, another technique that utilizes a GAN framework and unpaired images jointly trains a GAN to perform warping and stylization in an end-to-end manner.

However, while training a GAN framework using unpaired images can leverage more data than using paired images, the unpaired images introduce highly varied exaggerations from artists with divergent styles, even for the same subject, making learning consistent exaggerations difficult. Systems that use unpaired images also frequently have varying scales, poses, and low input-output correspondence, resulting in deep learning models that learn very high-level features that are not the most specific distinguishing features of a given face. The feature exaggerations for the caricatures that are learned by these models are also relatively coarse due to the use of sparse warping points. Also, in some cases, deep learning-based caricature generation systems result in warping that is not completely disentangled from the artistic stylization. For example, as noted above, some techniques jointly train warping and stylization in an end-to-end manner, such that the warping and the stylization are trained together. Such a solution results in less effective standalone warping and less flexibility for combining different warped images with different artistic styles.

One or more examples described herein include systems and related techniques for generating warped images of objects and that provide benefits over and solve one or more of the foregoing or other problems in the art. Warped images include caricatures, cartoons, and the like. In some examples, an object in a warped image includes a human or part of a human (e.g., a face of a person), an animal or part of an animal (e.g., a face of the animal), an inanimate object (e.g., a vase, chair, background elements in a scene, etc.), and/or other object.

The systems and related techniques described herein include a warped image generator that includes one or more neural networks and/or other machine learning models trained to generate high-quality warped images while disentangling geometry and style. For example, the warped image generator is trained to create high-quality warps and not a further stylized output, and thus the generation of the warped images (representing the geometry or structure of the subject in the warped image) is separated out from the further stylization of the warped images. In the systems described herein, the stylization of a warped image is performed using a separately trained stylization network. The warped image generator is trained using a paired supervised learning approach based on warped images created by one or more artists, in which case the warped image generator learns specific artist styles and thus can provide fine-tuned warped images (e.g., caricatures).

The warped image generator includes a perceiver network and a warping engine, which allow the warped image generator to provide enhanced performance when compared to other image warping approaches. For instance, in response to obtaining an image that includes a representation of an object that is to be warped for creating a caricature of the object, the perceiver network of the warped image generator generates a warping field. The warping field includes values representing displacements of the image in one or more directions (e.g., represented as different channels of scalar values). In some cases, the perceiver network generates the warping field by obtaining an input image and, through an operation referred to as a squeeze operation, producing a channel descriptor by aggregating feature maps across their spatial dimensions. This aggregation is followed by an excitation operation, where the output of the squeeze operation is used to produce a collection of per-channel modulation weights. These weights are then applied to the feature maps to generate an output that is used to create the warping field.

In some examples, the perceiver network is a neural network with parameters (e.g., weights, biases, and/or other parameters) that are pre-trained using a facial recognition dataset. In one illustrative example, the neural network is a truncated squeeze-and-excitation network pre-trained using a facial recognition dataset. In some examples, the perceiver network includes a pooling layer that outputs a warping field that is of reduced size compared to the size of the original image. In some cases, the warping field of the reduced size (as compared to the original image) is upsampled (e.g., using bilinear upsampling) to obtain a pixel displacement for some or all of the pixels for the object in the image. The pixel displacements are referred to herein as "per-pixel displacements."

To perform the warping of the object in the original image, the warping engine of the warped image generator applies the warping field (in some cases the upsampled warping field) to the original image. In some examples, the warping engine applies an interpolation (e.g., bilinear interpolation) to displace the pixels of the object in the image according to the learned per-pixel displacements of the warping field. Based on the warping of the object, the warped image generator outputs a warped image (e.g., a caricature).

In some implementations, the resulting warped image (e.g., caricature) of the object is used as input to a stylization network (e.g., CartoonGAN, etc.) to generate a stylized caricature of the object. For example, the stylization network applies a set of algorithms (e.g., patch-based algorithms, neural network algorithms, etc.) to an input image to stylize the input image to appear as if the input image was created using an artistic process (e.g., painting, drawing, etc.). The stylization network is separated from the warped image generator that is configured to generate the warped image (e.g., a caricature) of the object as described above. By separating operation of the warped image generator from the stylization network, any stylization network is usable to create a final image (e.g., stylized caricature).

In some examples, the warped image generator is trained using supervised learning techniques. For instance, a paired dataset of input images and known warped images is selected for training of the warped image generator. In some examples, the input images are obtained from public resources, such as image sharing platforms and/or from other sources (e.g., private image repositories, etc.). In one illustrative example, the known warped images are generated by artists using image manipulation applications. In some implementations, known warped images used to train the warped image generator include warped images generated by artists that share similar styles. From the known warped images, warping fields are generated and are used to generate warped images (e.g., a caricature).

In some examples, the resulting warping fields and warped images generated by the warped image generator are evaluated against the known warping fields and corresponding known warped images to determine the loss, or error, that is used to train the warped image generator. For instance, a warped image is compared to a known warped image to determine a performance (e.g., measured using a reconstruction loss function) of the perceiver network in generating the warped image from an input image. In one illustrative example, a reconstruction loss is determined based on a distance or difference between a known warped image and a warped image (e.g., a caricature) generated by the warped image generator using an input image. In another example, a known warping loss is determined based on a distance or difference between the known warping field for a known warped image and the warping field generated using the perceiver network for a particular input image from the paired dataset. In another example, a cosine similarity regularization loss is used to detect sudden or abrupt changes in contour resulting from application of an upsampled warping field generated by the warped image generator to an input image to generate the caricature. In some implementations, an overall loss (or error) for the warped image generator is determined as a function of the aforementioned losses described above. This overall loss, as well as the individual losses, is used to train the different components of the warped image generator. For instance, parameters of the warped image generator (e.g., weights and biases) is modified based on the overall loss.

The systems and related techniques described herein using the warped image generator provide several advantages over conventional image warping systems implementing generative adversarial networks (GANs) and/or other machine learning models. For example, because the warped image generator is disentangled from stylization, the warped image generator is paired with any stylization network or method for creating stylized caricatures. Further, because the warped image generator is trained using supervised training techniques, less data is required to train the warped image generator while preserving image details more effectively. As another example, since the warped image generator is trained using a loss derived using extracted warps provided by artists in addition to ground-truth images and derived prior to the execution of the differentiable warping engine, the warped image generator receives additional signals that allows the warped image generator to better learn artist-like warps that are specific to particular artists. Additionally, the warped image generator automatically exaggerates salient features of objects in a caricature-like manner and is scaled to control warping extent. These improvements result in the improvement of the visual quality of the warped images generated from a diverse range of objects.

As used herein, a "warped image generator" refers to a system or collection of systems that implements the perceiver network and the warping engine to generate warped images from an input image. Further, as used herein, a "perceiver network" refers to a neural network or other computing system that generates warping fields including pixel displacements (e.g., per-pixel displacements) and that is configured with parameters (e.g., weights, biases, and/or other neural network parameters) that are pre-trained using a dataset, such as a facial recognition dataset. A "warping engine" refers to a computing system or application that applies the warping field generated by the perceiver network to the input image to displace the pixels of the input image according to the pixel displacements of the warping field, resulting in a warped image. A "warped image," as used herein, refers to an image, such as a caricature, that has been manipulated by displacing one or more pixels of an object represented in the image, resulting in a warping of the object represented in the image. A "warping field," as used herein, refers to a representation (e.g., vector representation) of an image including values defining the displacements used for warping one or more objects in the image. One example of a warping field is a vector representation of an image, where individual vectors of the vector representation define the displacements of pixels that are applicable to one or more objects in the image. In some cases, the warping field includes a vector for each pixel location in the image.

FIG. 1 shows an illustrative example of an environment in which a warped image generator 122 generates a warped image 118, in accordance with at least one embodiment. For example, as described in more detail below, a warping engine 106 of the warped image generator 122 modifies an input image 110 using a warping field 114 to generate the warped image 118. In the environment 100, the input image 110 is provided as input to a perceiver network 102 of a warped image generator 122 to generate a warping field that is used to distort or warp the input image 110 in order to generate a warped image 118. The warped image 118 is stylized in order to create the output image 120. The input image 110 is a normalized red-green-blue (RGB) portrait image. The input image 110 is denoted as $X_{in} \in \mathbb{R}^{H \times W \times 3}$ where H and W denote the height and width of the input image 110, respectively. Further the input image 110 comprises three distinct channels representing the different color hues (e.g., RGB).

The perceiver network 102, in an embodiment, is a truncated Squeeze-and-Excitation Network (SENet50) with weights pre-trained using a dataset that includes images with particular objects. Any suitable dataset is usable to train the perceiver network 102. One illustrative example of a dataset used to train the perceiver network 102 is the VGGFace2 dataset. The VGGFace2 dataset is a large-scale facial recognition dataset that includes publicly available images selected in order to provide large variations in pose, age, illumination, ethnicity, profession, and other characteristics. The VGGFace2 dataset is described in greater detail in "VGGFace2, A Large Scale Image Dataset for Face Recognition," http://www.robots.ox.ac.uk/~vgg/data/vgg_face2/, which is hereby incorporated in its entirety into the present disclosure by reference. The SENet50 is selected due to its facial recognition performance, although one or more other networks are usable for the perceiver network 102 based on their performance in generating warping fields as described below.

In an embodiment, the perceiver network 102 includes a set of convolutional neural network (CNN) layers including the squeeze and excitation blocks of a SENet50 network, followed by an adaptive average pooling layer with a particular output size. For instance, the squeeze block obtains the input image and, through a squeeze operation, produces a channel descriptor by aggregating feature maps across their spatial dimensions. This aggregation is followed by an excitation operation via the excitation block, where the output of the squeeze operation is used to produce a collection of per-channel modulation weights. The per-channel modulation weights are applied to the feature maps to generate an output that is used by the adaptive average pooling layer to create the warping field. In some implementations, the adaptive average pooling layer has an output size of 32×32×2, where the output includes a 32×32 warping field with two channels including a first channel corresponding to a displacement of pixels in a horizontal direction (the x direction on a two-dimensional coordinate system) and a second channel corresponding to a displacement of pixels in a vertical direction (the y direction in a two-dimensional coordinate system). The output size of the pooling layer differs in other implementations. Training of the perceiver network 102 and other components of the warped image generator 122 is described below.

The network architecture of the perceiver network 102 is a truncated network as compared to the SENet50 network. Truncation of the perceiver network 102 is performed to reduce network capacity and prevent overfitting to the small dataset used to train the network. The selection of a 32×32 warping field is made based on the desired granularity of the warping field as well as the utility of this warping field for the creation of warped images. For instance, a larger warping field results in greater granularity, which impacts the performance of the warped image generator 122 in generating the warped images. Alternatively, a smaller warping field yields less exaggerated warped images (e.g., caricatures). The SENet50 network is described in greater detail in "Squeeze-and-Excitation Networks," by J. Hu, L. Shen, S. Albanie, G. Sun, and E. Wu, https://arxiv.org/pdf/1709.01507.pdf, which is hereby incorporated in its entirety into the present disclosure by reference.

The resulting warping field 112 generated by the perceiver network 102 is provided to an upsampling system 104 of the warped image generator 122. The upsampling system 104 upsamples the warping field 112 to generate an upsampled warping field 114 that incorporates the per-pixel displacements in the x and y directions that are to be applied to the input image 110. For instance, the warping field $\hat{F}_{32} \in \mathbb{R}^{32 \times 32 \times 2}$ is upsampled by the upsampling system 104 via bilinear interpolation to obtain the upsampled warping field 114, $\hat{F} \in \mathbb{R}^{H \times W \times 2}$, which represents the per-pixel displacements in the x and y direction that are to be applied to the input image 110. During inference when the previously-trained network is applied to an image, the warping field 114 is multiplied by a scaling factor α to control the intensity of the warp. The selection of the scaling factor α is described in greater detail below in connection with FIG. 5.

In an embodiment, the warped image generator 122 further includes a warping engine 106 that is configured to overlay the upsampled warping field 114 onto the input image 110, resulting in an overlaid image 116 that is used to warp the input image 110 to generate the warped image 118. For instance, using the upsampled warping field 114, the warping engine 106 performs bilinear interpolation to displace the pixels of the input image 110 according to the learned displacements from the upsampled warping field 114. In some cases, the warping engine 106 provides the resulting warped image 118 as output (e.g., by displaying the warped image 118, storing the warped image 118, etc.) to the user that submitted the input image 110 to fulfill the user's request.

In some examples, the warping engine 106 uses the warped image 118 as input to a stylization network 108 (e.g., CartoonGAN, other stylization generative adversarial networks, etc.) in order to have the warped image 118 modified (or stylized) to appear as if generated via an artistic process, resulting in a desired output image 120. For instance, in a request to generate an output image 120 from a provided input image 110, a user specifies the stylization network 108 that is to be used to stylize the warped image 118 generated by the warping engine 106.

In an embodiment, the warped image generator 122 includes a deep learning caricature generation model that is trained using supervised learning techniques to generate warped images including exaggerations that amplify distinguishing features of the face while preserving facial detail. For instance, to perform the warping of the input image 110, $X_{in}$, the perceiver network 102 learns a warping field (also referred to in some cases as a flow field) during training. The learned warping field, $\hat{F} \in \mathbb{R}^{H \times W \times 2}$, is applied to $X_{in}$ to obtain a caricature, $\hat{X}_{toon}$. The first channel of dimension W×H (e.g, width and height of the input image) is a grid of scalar values representing the per-pixel displacement of $X_{in}$ in the x direction, while the second channel encodes the same for the y direction.

Using faces as an example of an object, the warped image generator 122 (e.g., the perceiver network 102 and in some cases the warping engine 106) is trained using a set of portrait images of frontal-facing people. In some examples, the set of portrait images is obtained from a public repository of images and/or from one or more other image sources. For instance, a set of portrait images is selected from the VGGFace2 dataset or from any online photo management platform (e.g., Flickr®, etc.). In some cases, the selected images cover a broad range of age groups, sexes, races, and face shapes. In an embodiment, the set of images are manually warped by one or more caricature artists using digital image manipulation software applications to generate "ground-truth" artist warped images (in some cases referred to as known warped images). The original images and the artist warped images are paired to generate a paired dataset of images ($X_{in}$, $X_{toon}$), where $X_{in}$ represents the original input image and $X_{toon}$ represents the corresponding artist-generated caricature. These paired datasets are divided into a subset of training datasets that are used to train the warped image generator 122 and a subset of validation datasets that is used to validate the warped image generator 122 by determining its performance in warping the input images. A training dataset, without ground truth labels, is collected from various subjects and public sources.

In an embodiment, an additional component of the dataset is the estimated artist warping fields, $F_{32} \in \mathbb{R}^{32 \times 32 \times 2}$, that, after bilinear upsampling by the upsampling system 104 to size H×W×2 (where H×W represent the dimensions of $X_{in}$), correspond to each artist caricature. To obtain the artist warping fields, gradient descent optimization is performed on the warping field for each $X_{toon}$ with L1 loss through the warping engine 106 to obtain the artist warping fields that correspond as closely as possible to each $X_{toon}$. This includes solving the optimization represented in Eq. 1:

$$\operatorname{argmin}_{F_{32}} \|X_{toon} - \operatorname{Warp}(x_{in}, \operatorname{Upsample}(F_{32}))\|_1 \quad \text{(Eq. 1)}$$

where "Warp" denotes the warping engine 106 and "Upsample" denotes the upsampling system 104, representing the upsampled warping field generated by the upsampling system 104. The L1 loss represents the mean absolute error (MAE), which is the sum of the absolute differences between the target and predicted variables, as denoted in Eq. 2:

$$L1 \text{ Loss} = \frac{\sum_{i=1}^{n} |y_i - y_i^p|}{n} \quad \text{(Eq. 2)}$$

where $y_i$ denotes the target, or "ground-truth," and $y_i^p$ denotes the predicted value.

In an embodiment, the warped image generator 122 is trained using different loss functions that are applied to improve the performance of the perceiver network 102, upsampling system 104, and the warping engine 106 in generating a warped image 118. For instance, a reconstruction loss, $\mathcal{L}_{recon}$, is implemented that penalizes the L1 distance between the artist-generated caricature, $X_{toon}$, and the warped image 118 generated by the warped image generator 122, $\hat{X}_{toon}$. Thus, the L1 distance between these warped images is applied to Eq. 1 described above to obtain the L1 loss ($\mathcal{L}_{recon}$). In addition to the reconstruction loss, the warping fields themselves are also supervised with the corresponding artist warping fields, $F_{32}$. For instance, in an embodiment, an artist warping loss, $\mathcal{L}_{warp}$, is determined by penalizing the L1 distance between the artist warping field, $F_{32}$, obtained using Eq. 1, and the estimated warping field, $\hat{F}_{32}$, generated by the perceiver network 102. Thus, the artist warping loss is computed as an L1 loss based on the L1 distance between the artist warping field and the estimated warping field.

In an embodiment, a cosine similarity regularization loss, $\mathcal{L}_{reg}$, is introduced to encourage the warping field to be smooth and have fewer sudden changes in contour. This loss is used to train the upsampling system 104 for when the upsampling system 104 processes the warping field 112 to generate the upsampled warping field 114 and per-pixel displacements for the input image. The cosine regularization similarity loss, $\mathcal{L}_{reg}$, is described using Eq. 3:

$$\mathcal{L}_{reg} = \sum_{i,j \in \hat{F}} \left( 2 - \frac{\langle \hat{F}_{i,j-1}, \hat{F}_{i,j} \rangle}{\|\hat{F}_{i,j-1}\| \|\hat{F}_{i,j}\|} - \frac{\langle \hat{F}_{i-1,j}, \hat{F}_{i,j} \rangle}{\|\hat{F}_{i-1,j}\| \|\hat{F}_{i,j}\|} \right) \quad \text{(Eq. 3)}$$

where $\langle \hat{F}_{i,j-1}, \hat{F}_{i,j} \rangle$ denotes the dot product of the upsampled warping field P at pixel indices i, j−1 and i, j.

The overall loss function used to train the warped image generator 122 is defined as a function of the artist warping loss, the cosine similarity regularization loss, and the reconstruction loss defined above. Thus, the overall loss function, $\mathcal{L}_{gen}$, used to train the warped image generator 122 is defined using Eq. 4:

$$\mathcal{L}_{gen} = \lambda_1 \mathcal{L}_{recon} + \lambda_2 \mathcal{L}_{warp} + \lambda_3 \mathcal{L}_{reg} \quad \text{(Eq. 4)}$$

where the values for $\lambda_1$, $\lambda_2$, and $\lambda_3$ are empirically set based on experimentation. For instance, in an embodiment, an Adam adaptive learning rate optimization algorithm with hyperparameters $\beta_1$ set to 0.5 and $\beta_2$ set to 0.999, with a learning rate decay of 0.95, is used to train the warped image generator 122. Batches comprising randomly selected and aligned input-artist caricature pairs with corresponding artist warping fields are selected for training. Further, online data augmentation is applied to the input images, such as random horizontal flips and color jitter (e.g., brightness, contrast, saturation jitter each uniformly samples from the range [0.9, 1.1] and hue jitter uniformly sampled from the range [−0.05, 0.05]). It should be noted that the values presented herein are for illustrative purposes and other values are selectable based on desired performance characteristics for the warped image generator 122.

Figure 2:
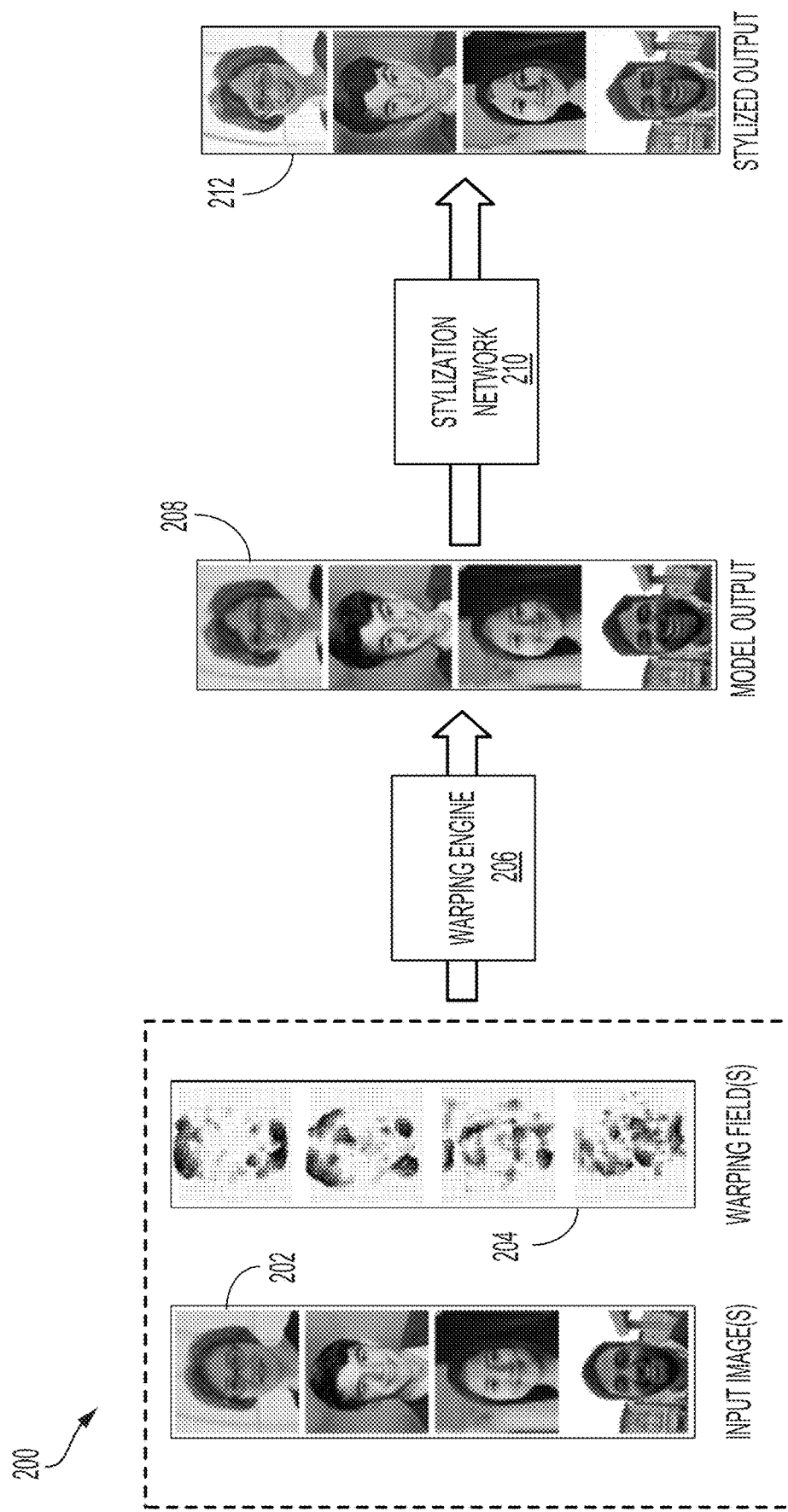
FIG. 2 shows an illustrative example of an environment in which a warping engine generates a set of warped images that are processed using a stylization network to generate stylized image outputs in accordance with at least one embodiment.

FIG. 2 shows an illustrative example of an environment 200 in which a warping engine 206 generates a set of warped images 208 that is processed using a stylization network 210 to generate stylized image outputs 212 in accordance with at least one embodiment. In the environment 200, a warping engine 206 of the warped image generator uses one or more original input images 202 and a set of corresponding upsampled warping fields 204 to generate the set of warped images 208. As noted above, the upsampled warping fields 204 are generated by an upsampling system of the warped image generator, which processes, using bilinear upsampling, an estimated warping field, $\hat{F}_{32}$, generated by the perceiver network. Each of the warping fields 204 serve as the per-pixel displacements in the x and y direction that are to be applied to the corresponding input image to generate a warped image.

In an embodiment, a scaling factor α is applied to each of the warping fields 204 to manipulate the warping intensity (e.g., the per-pixel displacements). The scaling factor α is applied in inference. The scaling factor α is selected based on the desired amplification or exaggeration of facial asymmetries desired in the resulting warped images. For instance, as the scaling factor α is increased, facial asymmetries represented in a warped image are amplified, which are of importance for creating warped images as this often marks distinguishing features in individuals' faces. If the resulting overall loss between a training image and a corresponding artistic rendering exceeds a threshold, the scaling factor α is adjusted accordingly to increase or reduce, as needed, the per-pixel displacements that are to be applied to the input images.

To generate the set of warped images 208, the warping engine 206 applies the warping fields 204 to the input images 202, $X_{in}$. For instance, the warping engine 206 performs bilinear interpolation to displace the pixels of $X_{in}$ according to the learned displacements $\hat{F}$, or Warp($x_{in}$, $\hat{F}$), where "Warp" is the warping engine 206. The resulting warped images 208 are further manipulated using a stylization network 210 to generate the stylized image outputs 212. For instance, the warping engine 206 uses the resulting warped images 208 as input to the stylization network 210 in order to have the warped images 208 stylized, resulting in the stylized image outputs 212. For instance, in its request to generate an output image from a provided input image, a user specifies the stylization network 210 that is to be used to stylize a warped image generated by the warping engine 206. The stylization network 210 applies one or more algorithms (e.g., patch-based algorithms, neural network algorithms, etc.) to an input image (e.g., warped images 208) to modify the input image so as to make the resulting image appear as if it was generated via an artistic process or otherwise incorporate the nuances of an artist's stylistic preferences.

Figure 3:
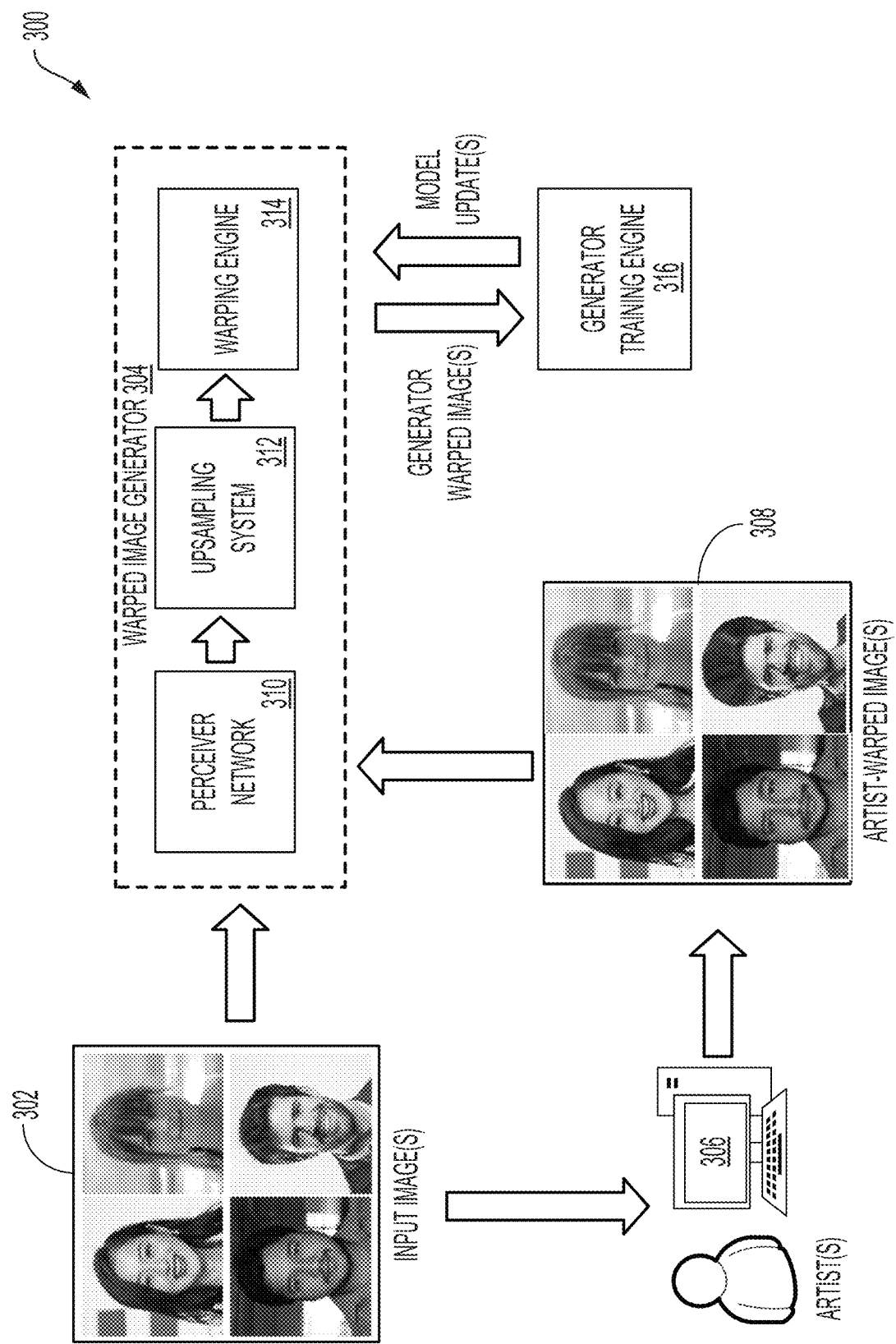
FIG. 3 shows an illustrative example of an environment in which a set of input images are manually warped by one or more artists to generate a training dataset for training a warped image generator for generating warped images in accordance with at least one embodiment.

FIG. 3 shows an illustrative example of an environment 300 in which a set of input images 302 are manually warped by one or more artists 306 to generate a training dataset for performing supervised training of a warped image generator 304 for generating warped images in accordance with at least one embodiment. In the environment 300, a training dataset is created that includes pairings of input images 302, $X_{in}$, and corresponding artist-warped images 308, $X_{toon}$. The input images 302 to be used for training the warped image generator 304 are selected from various public sources or other image sources. The input images 302 are portrait images of frontal-facing people, selected to cover a broad range of age groups, sexes, races, face shapes, and other characteristics.

The input images 302 are provided to the one or more artists 306 that manually warp the input images 302 using a digital image manipulation application. Each artist warps the set of input images 302 in accordance with the artist's particular warping style. In order to provide consistent training of the warped image generator 304, the one or more artists 306 selected have similar warping styles. The one or more artists 306 generate artist-warped images 308, $X_{toon}$, that serve as the "ground-truth" for evaluating the performance of the warped image generator 304 when generating warped images from the set of input images 302. The resulting paired dataset of images ($X_{in}$, $X_{toon}$) is split into training and validation images that are used to train the warped image generator 304. Further, in an embodiment, a training set, without ground-truth labels, is collected from various subjects and public sources for use in training the warped image generator 304.

In addition to the artist-warped images 308, artist warping fields are generated, which are used to evaluate the performance of the perceiver network 310 in generating a warping field for each of the input images 302. To obtain the artist warping fields, gradient descent optimization is performed on the warping field for each $X_{toon}$ with L1 loss through the warping engine 314. These artist warping fields correspond as closely as possible to each $X_{toon}$. The optimization described above in Eq. 1 is solved in order to obtain these artist warping fields.

In an embodiment, the input images are processed by the perceiver network 310 to generate a set of warping fields, $\hat{F}_{32} \in \mathbb{R}^{32 \times 32 \times 2}$, that is upsampled by the upsampling system 312 to generate upsampled warping fields, $\hat{F} \in \mathbb{R}^{H \times W \times 2}$, which represent the per-pixel displacements in the x and y direction that are to be applied to the input images 302. The warping engine 314 applies the upsampled warping fields, $\hat{F}$, to the set of input images 302 to generate a set of warped images that is evaluated by a generator training engine 316 to determine whether the resulting loss for these warped images exceeds one or more threshold criteria. For instance, in an embodiment, the generator training engine 316 determines the reconstruction loss, cosine similarity regularization loss, and the artist warping loss for the warped image generator 304. The reconstruction loss is determined based on the L1 distance between an artist-warped image (from artist-warped images 308), $X_{toon}$, and the warped image, $\hat{X}_{toon}$. The cosine similarity regularization loss is computed using Eq. 3, described above. The artist warping loss is determined based on the L1 distance between the artist warping field, $F_{32}$, and the warping field generated by the perceiver network 310, $\hat{F}_{32}$. The overall loss for the warped image generator 304 is a function of the reconstruction loss, cosine similarity regularization loss, and the artist warping loss, as described in Eq. 4.

As noted above, the generator training engine 316 uses an adaptive moment optimization (Adam) algorithm with hyperparameters $\beta_1$ set to 0.5 and $\beta_2$ set to 0.999, with a learning rate decay of 0.95, is used to train the warped image generator 304. Batches comprising randomly selected and aligned input-artist caricature pairs with corresponding artist warping fields are selected for training. Further, online data augmentation is applied to the input images, such as random horizontal flips and color jitter (e.g., brightness, contrast, saturation jitter each uniformly samples from the range [0.9, 1.1] and hue jitter uniformly sampled from the range [−0.05, 0.05]). It should be noted that the values presented herein are for illustrative purposes and other values are selectable based on desired performance characteristics for the warped image generator 304.

In one illustrative example, supervised learning techniques are used to train the warped image generator 304. For instance, a backpropagation training process is used to adjust the weights (and in some cases other parameters, such as biases) of the nodes of the neural network (e.g., warped image generator 304). Backpropagation includes a forward pass, a loss function, a backward pass, and a weight update. The forward pass, loss function, backward pass, and parameter update is performed for one training iteration. The process is repeated for a certain number of iterations for each set of training data until the weights of the parameters of the warped image generator 304 are accurately tuned.

As noted above, training data used to train the warped image generator 304 includes artist-warped images 308, $X_{toon}$, generated manually by one or more artists 306 from the original set of input images 302 as a known output and the set of input images 302, $X_{in}$, as input to the warped image generator 304. The forward pass includes passing an input image through the neural network (e.g., warped image generator 304). The weights are initially randomized before the neural network is trained. For a first training iteration for the neural network system, the output includes values that do not give preference to any particular output, as the weights have not yet been calibrated. For example, the output includes a data representation (e.g., a vector, tensor, etc.) with values representing a warped image, $\hat{X}_{toon}$. After the first training iteration using the initial weights, the warped image, $\hat{X}_{toon}$, will likely not resemble the corresponding artist-warped image, $X_{toon}$.

The reconstruction loss, cosine similarity regularization loss, artist warping loss, and the overall loss function defined in Eq. 4 are used to analyze error in the output. In the example using input images as input and artist-warped images 308, $X_{toon}$, as the known output, the loss function defined in Eq. 4 is used to train the warped image generator 304. Further, the individual losses (e.g., reconstruction loss, cosine similarity regularization loss, artist warping loss) is used to train the various components of the warped image generator 304. For instance, the cosine similarity regularization loss is used to train the upsampling system 312 to improve the smoothness of the upsampled warping field used to warp the input images 302. As another example, the artist warping loss is used to train the perceiver network 310 to improve the generation of the warping field that is to be upsampled by the upsampling system 312.

The loss (or error) may be high for the first training images, since the actual output values (a warped image by the network) may be much different than the predicted output (a known artist-warped image of the input image). A goal of training is to minimize the amount of loss for the predicted output. The neural network performs a backward pass by determining which inputs (weights) most contributed to the loss of the neural network, and adjusts the weights so the loss decreases and is eventually minimized. A derivative of the loss with respect to the weights (denoted as dL/dW, where W are the weights at a particular layer) is computed to determine the weights that most contributed to the loss of the neural network. For example, the weights are updated so they change in the opposite direction of the gradient. The weight update is denoted as $$w = w_i - \eta \frac{dL}{dW},$$

where w denotes a weight, $w_i$ denotes the initial weight, and $\eta$ denotes a learning rate. The learning rate is set to any suitable value, with a high learning rate including larger weight updates and a lower value indicating smaller weight updates. The warped image generator 304 continues to be trained in such a manner until a desired output is achieved. In some cases, each of the components of the warped image generator 304 (e.g., the perceiver network 310, the upsampling system 312, and the warping engine 314) is trained in a similar manner.

Figure 4:
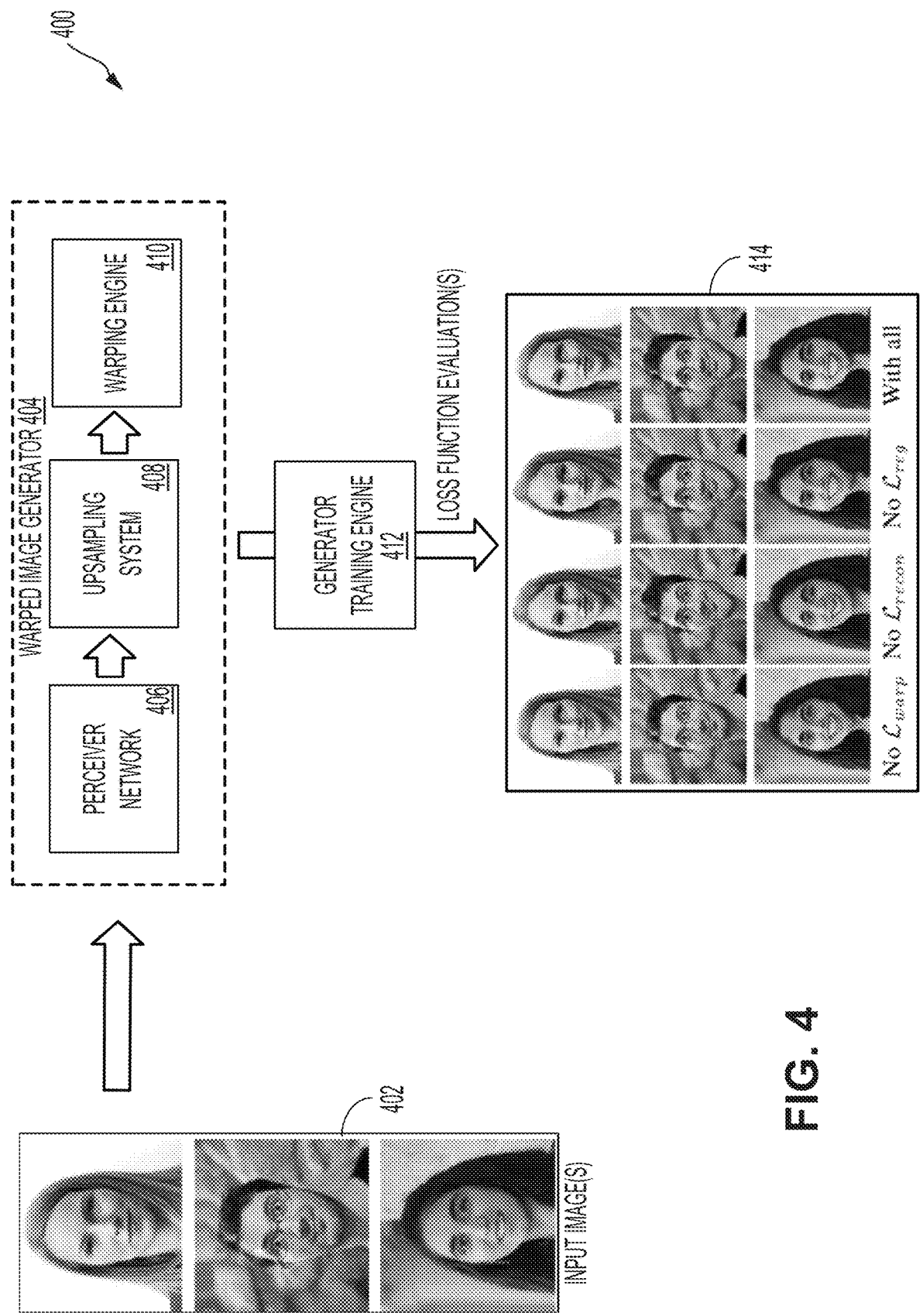
FIG. 4 shows an illustrative example of an environment in which an evaluation of warped images generated using different combinations of loss functions is performed to identify appropriate loss functions for generation of warped images in accordance with at least one embodiment.

FIG. 4 shows an illustrative example of an environment 400 in which an evaluation of warped images 414 generated using machine learning models trained using different combinations of loss functions is performed to identify appropriate loss functions for generation of warped images in accordance with at least one embodiment. In the environment 400, different variations of the warped image generator 404 are trained in order to analyze the contribution of each loss function to the overall warped image generator 404 performance. For instance, one variation of the warped image generator 404 is trained without the artist warp loss, $\mathcal{L}_{warp}$. A second variation of the warped image generator 404 is trained without the reconstruction loss, $\mathcal{L}_{recon}$. A third variation of the warped image generator 404 is trained without the cosine similarity regularization loss, $\mathcal{L}_{reg}$. Finally, as a control, another variation of the warped image generator 404 is trained with the complete loss function. A first subset of images introduced as part of the set of input images 402 includes validation images that are used to gauge the performance of the warped image generator 404 and its components (e.g., the perceiver network 406, the upsampling system 408, and the warping engine 410). Further, a second subset of images introduced as part of the set of input images 402 includes training images that are used to train the different variations of warped image generator 404 subject to their corresponding loss functions.

In an embodiment, a generator training engine 412 evaluates the performance of the different variations of the warped image generator 404 to determine which combination of loss functions provides the desired results when compared to corresponding artist renderings generated by artists or other entities as a "ground-truth" for the model. For instance, without the artist warp loss, $\mathcal{L}_{warp}$, used to train the warped image generator 404, the generator training engine 412 determines that the resulting warps are weaker and constrained to detailed features. Further, the warped image generator 404 is limited in how it alters the face shape of the subject in each of the input images when generating the warped images 414. Without the artist warp loss, $\mathcal{L}_{warp}$, the warping field $\hat{F}_{32}$ generated by perceiver network 406 is not reconciled against the artist warping field corresponding to an artist's rendering of the input image, which results in a constant or greater L1 distance between the warping field $\hat{F}_{32}$ and the artist warping field $F_{32}$. Further, this has impact on the per-pixel displacements that are applied to the input image in generating the caricature.

Without the reconstruction loss, $\mathcal{L}_{recon}$, the generator training engine 412 determines that the resulting warps are larger in scope, but twist the face of the subject in the input images dramatically to the point where the warped image generator 404 unnaturally distorts the face. As noted above, the reconstruction loss, $\mathcal{L}_{recon}$, penalizes the L1 distance between the artist cartoon and the generated cartoon. Thus, without this penalty, the warped image generator 404 is trained solely on the artist warp loss and cosine similarity regularization loss, resulting in a warping field that includes greater, or more dramatic, per-pixel displacements resulting in even greater warping of asymmetrical features of faces represented in the set of input images 402.

Without the cosine similarity regularization loss, $\mathcal{L}_{reg}$, the generator training engine 412 determines that the warping field generated using the perceiver network 406 and upsampling system 408 is less smooth and, thus, introduces implausible asymmetries, artifacts, and inconsistencies in the facial warping performed by the warping engine 410. As noted above, the cosine similarity regularization loss, $\mathcal{L}_{reg}$, is used to encourage the warping field to be smooth and have fewer sudden changes in contour. Thus, removal of this loss function results in increased jaggedness in the per-pixel displacements applied to the input images 402.

Figure 5:
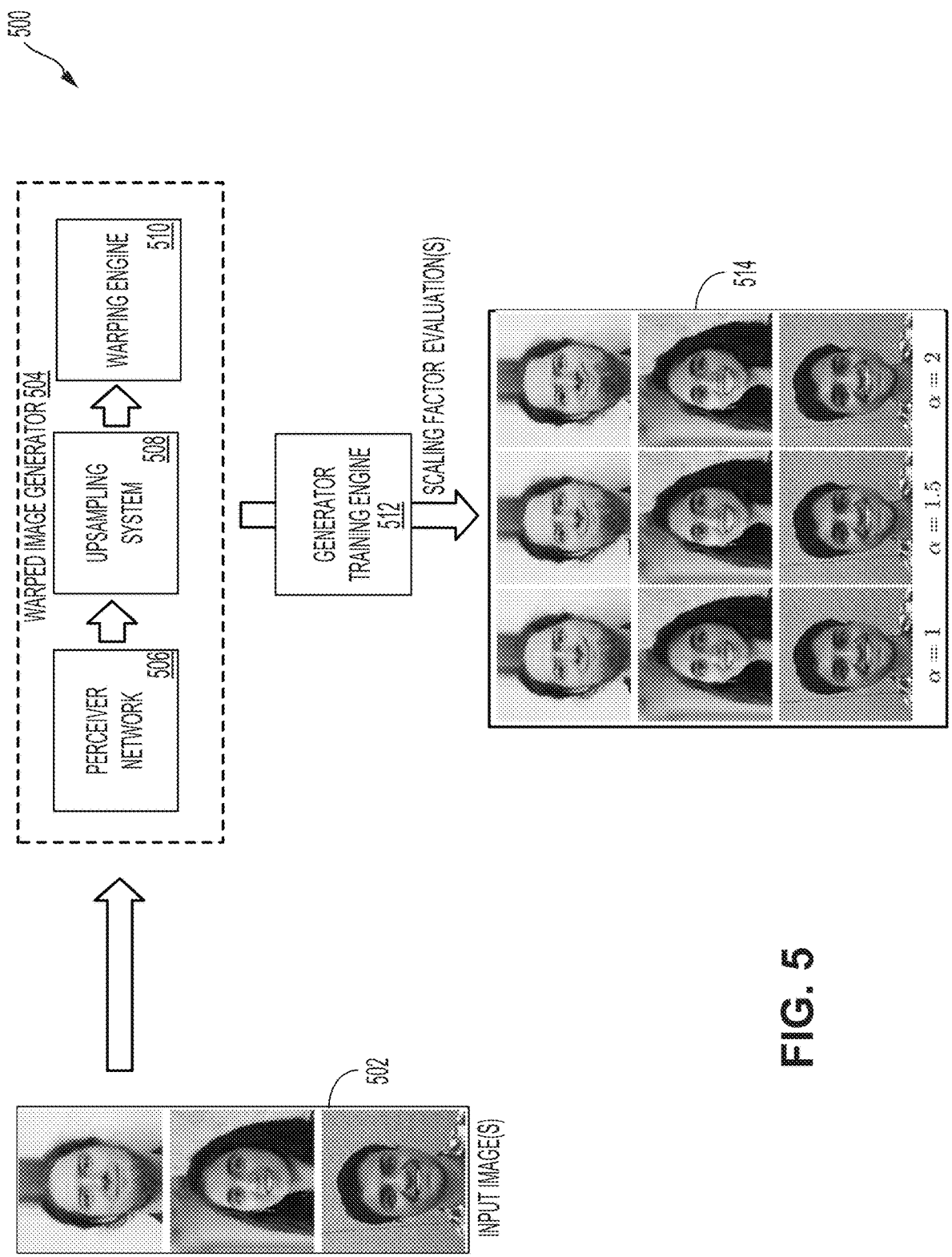
FIG. 5 shows an illustrative example of an environment in which an evaluation of warped images generated using different scaling factors is performed to identify an appropriate scaling factor for generation of warped images in accordance with at least one embodiment.

FIG. 5 shows an illustrative example of an environment 500 in which an evaluation of warped output images 514 generated using different scaling factors is performed to identify an appropriate scaling factor for generation of warped images in accordance with at least one embodiment. In the environment 500, a warped image generator 504 obtains a set of input images 502 that are to be warped subject to different upsampled warping fields in order to determine the effect of changing a scaling factor used by an upsampling system 508, along with bilinear interpolation, to generate the upsampled warping fields. For instance, the warped image generator 504 processes an image from the set of input images 502 through a perceiver network 506 to obtain a warping field.

In an embodiment, the warping field is processed using the upsampling system 508 using bilinear interpolation to obtain a wireframe or other field that represents the per-pixel displacements to be applied to the input image. In inference, the warping field is also multiplied by a scaling factor $\alpha$ to control the intensity of the warp applied to the input image. As an illustrative example, the subject represented in the second image of the set of input images 502 has a left eye (from the subject's perspective) that is slightly smaller than their right eye. Increases in the scaling factor $\alpha$ result in this facial asymmetry being amplified when the resulting warping field is applied to the input image of this subject. Similar amplifications of asymmetrical features occur in proportion to the increase in the scaling factor $\alpha$. This sort of exaggeration of asymmetry, in some instances, is crucial for creating warped images as this marks distinguishing features in an individual's face.

In an embodiment, the different warping fields for each image of the set of input images 502 are applied to the corresponding input image by the warping engine 510 to generate the warped output images 514. The output images 514 represent different warped images of the individuals presented in the set of input images 502, subject to different scaling factors $\alpha$. As noted above, as the scaling factor $\alpha$ is increased, amplifications of asymmetrical features occur. However, the increase in scaling factor $\alpha$ has an adverse impact on the warping field, resulting in an increase in the smoothness regularization loss due to an over-amplification of the asymmetrical features and corresponding loss of smoothness of the various warps. The output images 514 are evaluated using the generator training engine 512 to determine the resulting model loss as a function of the scaling factor $\alpha$ and the resulting warping fields. Based on the resulting model loss, the generator training engine 512 adjusts the value of the scaling factor $\alpha$ to minimize the smoothness regularization loss and the overall model loss resulting from a comparison of the resulting warped image and an artist-warped image generated using a corresponding image from the set of input images 502.

Figure 6:
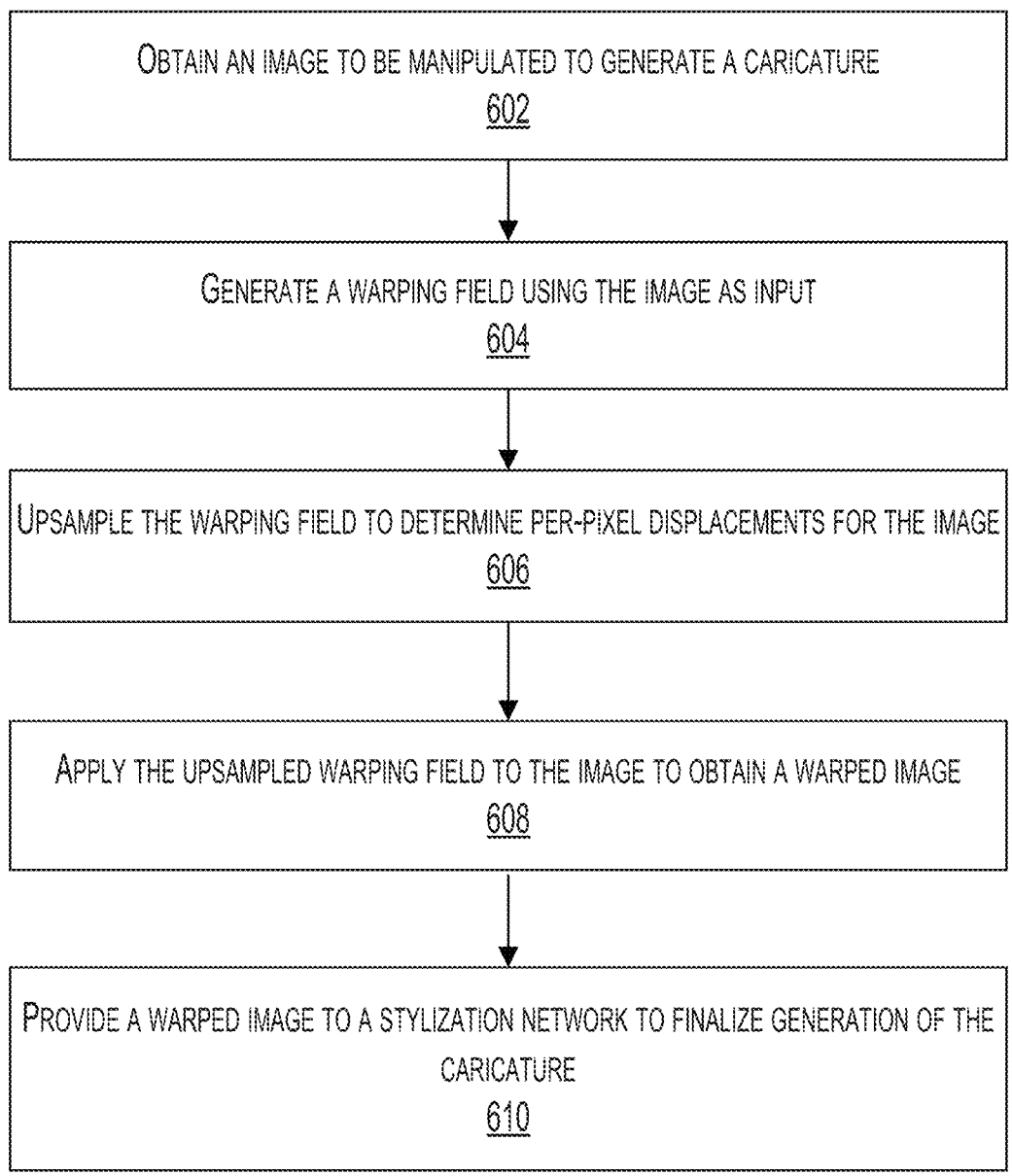
FIG. 6 shows an illustrative example of a process for generating a warped image using a warping field generated using a perceiver network and upsampling system in accordance with at least one embodiment.

FIG. 6 shows an illustrative example of a process 600 for generating a warped image using a warping field generated using a perceiver network and upsampling system in accordance with at least one embodiment. The process 600 is performed by a warped image generator, which obtains an image of a human that is to be converted, via warping of the image of the human, into a caricature of the human that is to be stylized using a stylization network, as noted above. The various components of the warped image generator (e.g., perceiver network, upsampling system, and warping engine) are trained using supervised learning techniques as described above and in connection with FIG. 7. It should be noted that while humans are described extensively throughout the present disclosure for the purpose of illustration, other objects presented in images is warped according to the techniques described herein.

In an embodiment, at block 602, the warped image generator obtains an image that is to be manipulated in order to generate a caricature. The image is obtained from a user or other entity via an application (e.g., a photo editing application, etc.), whereby a user submits a request to modify a provided image in order to generate a caricature of a human represented on the digital image. For instance, the digital image includes a digital representation of a frontal-facing person. Although the warped image generator is trained using frontal-facing images, it should be noted that digital images including digital representations of humans that deviate from a frontal pose may be provided and processed to generate warped images of these humans.

At block 604, the warped image generator generates a warping field using the provided digital image as input to a perceiver network. As noted above, the perceiver network, in an embodiment, is a truncated SENet50 network with weights pre-trained on the VGGFace2 Dataset. This particular network is selected due to its facial recognition performance. The network is modified to retain the original layers up to and including the squeeze and excitation blocks of the SENet50 network, followed by an adaptive average pooling layer with output size of 32×32×2, where the output is a 32×32 warping field with two channels corresponding to displacement of pixels in the x and y directions. This truncating of the perceiver network is performed to reduce network capacity and prevent overfitting to the small dataset used to train the network.

At block 606, the warped image generator upsamples the warping field to determine the per-pixel displacements for the provided image. For instance, the warped image generator, via an upsampling system, uses bilinear interpolation, subject to a scaling factor $\alpha$, to generate a warping field that corresponds to the dimensions of the provided image. This upsampled warping field includes the per-pixel displacements to be applied to the image in order to produce the warped image, or caricature, of the human represented in the digital image.

At block 608, the warped image generator, via the warping engine, applies the upsampled warping field to the input image to obtain a warped image, or caricature, of the human digitally represented on the digital image. For instance, the warping engine overlays the upsampled warping field over the input digital image to determine how to manipulate the pixels of the input digital image in order to generate the caricature. In an embodiment, the warped image is presented to the user to determine whether the resulting caricature is acceptable for stylization or requires additional manipulations or modifications. If the user indicates that further changes are required, the warped image generator identifies unique modifications to the weights and/or factors utilized by the perceiver network, upsampling system, and/or warping engine that are performed to change the warping of the digital image.

At block 610, the warped image generator provides the warped image to a stylization network to finalize the generation of the caricature. For instance, in the request to generate the caricature, the user specifies which stylization network (e.g., CartoonGAN, etc.) is to be used to stylize the warped image generated by the warped image generator. Alternatively, if the user does not specify which stylization network is to be utilized for the warped image, the warped image generator selects a stylization network or utilize a particular stylization network by default to stylize the warped image and finalize generation of the caricature. The warped image generator presents, or otherwise provides, the finalized caricature to the user via the application or through other methods (e.g., electronic communication, etc.).

Figure 7:
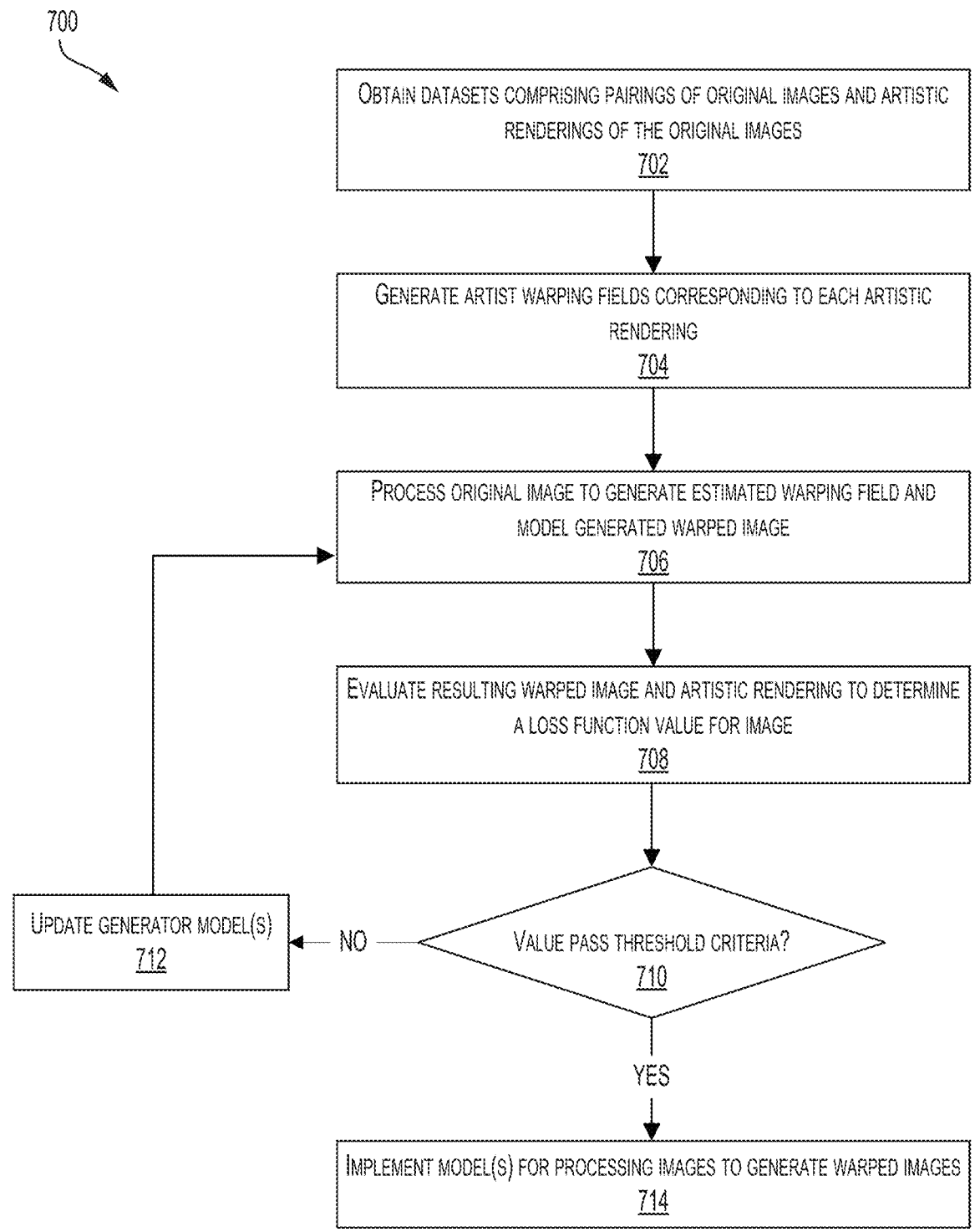
FIG. 7 shows an illustrative example of a process for training a warped image generator usable to warp images and generate warped images in accordance with at least one embodiment.

As noted above, the warped image generator utilizes a training dataset and a validation dataset comprising pairings of input images and artist renderings of the input images to evaluate the performance of the machine learning models utilized to warp the set of input images and to train these machine learning models based on their performance. FIG. 7 is a flow diagram illustrating an example of a process 700 for training a warped image generator usable to warp images and generate warped images in accordance with at least one embodiment. The process 700 is performed by the aforementioned warped image generator, which trains one or more warped image generator models (e.g., the perceiver network and warping engine) based on the performance of these models compared to artist renderings generated using a set of input images.

In an embodiment, the warped image generator, at block 702, obtains one or more datasets comprising pairings of original images (e.g., input images comprising human faces) and artistic renderings of these original images. For instance, the warped image generator obtains, from an appropriate source (e.g., public repository of images, database of images maintained by a provider of the warped image generator, etc.), portrait images of frontal-facing individuals. The selection of portrait images is performed to cover a broad range of age groups, sexes, races, face shapes, and other characteristics of humans. The selected images, in an embodiment, are provided to one or more artists who manually generate digital warped images from these selected images. These digital warped images serve as ground-truth artist warped images that are used to evaluate the performance of the machine learning models of the warped image generator. The one or more artists are selected such that the resulting warped images share a similar artistic style.

The paired datasets, in an embodiment, are divided into a subset of training datasets and a subset of validation datasets. The subset of validation datasets is selected at random from the set of image pairings and is used to evaluate the performance of the machine learning models trained using the subset of training datasets. Thus, the validation datasets are used to define a "ground-truth" for determining how the machine learning models used to generate warped images perform compared to artist-generated warped images.

The warped image generator, at block 704, generates artist warping fields corresponding to each artist rendering of the training dataset. For instance, the warped image generator performs gradient descent optimization on the warping field for each L1 loss through the differentiable warping engine of the warped image generator to obtain artist warping fields that correspond as closely as possible to each artist rendering of the training dataset.

At block 706, the warped image generator processes the original input images of the training dataset to generate estimated warping fields and model generated renderings of the original image (e.g., warped images). For instance, the warped image generator uses an original image as input to a perceiver network to obtain a warping field having an output size of 32×32×2, wherein the warping field includes two channels corresponding to the displacement in the x and y directions for each pixel. The warped image generator processes, using an upsampling system, the warping field to obtain the per-pixel displacements for the original image. The upsampling system, in an embodiment, utilizes bilinear upsampling to obtain these per-pixel displacements. The warped image generator, via the warping engine, processes the original image using the upsampled warping field to obtain a warped image, or caricature, of the original image of the training dataset.

At block 708, the warped image generator evaluates the warped image and corresponding artistic rendering generated by an artist using the original image to determine the loss function value for the image. As noted above, to determine the loss function value for a resulting warped image, the warped image generator determines the reconstruction loss for the warped image, the cosine similarity regularization loss for the warping field used to generate the warped image, and an artist warping loss for the warping field. The reconstruction loss for the warped image penalizes the L1 distance between the artist-generated warped image of the original image and artist-generated warped image pairing and the warped image generated by the warped image generator via the perceiver network, upsampling system, and warping engine. The cosine similarity regularization loss corresponds to a "smoothness" of the warping field used to generate the warped image, whereby this loss increases in proportion to the number of sudden changes in contour within the upsampled warping field. The artist warping loss penalizes the L1 distance between the artist warping field described above and the estimated warping field generated by the perceiver network. Each of these losses is multiplied by a corresponding weight factor that is selected empirically to apply a weight to each of the losses in calculating the overall loss for the warped image.

At block 710, the warped image generator determines whether the resulting overall loss value for the warped image passes one or more threshold criteria. For instance, the loss (or error) will be high for the first warped images generated from the training dataset since the actual values will be much different than the predicted output. The goal of training is to minimize the amount of loss so that the predicted output is the same as the training label. The warped image generator performs a backward pass by determining which inputs (weights) most contributed to the loss of the network, and adjusts the weights so that the loss decreases and is eventually minimized.

A derivative of the loss with respect to the weights (denoted as dL/dW, where W are the weights at a particular layer) is computed to determine the weights that contributed most to the loss of the network. After the derivative is computed, a weight update is performed by updating all the weights of the different components of the warped image generator (e.g., perceiver network, upsampling system, and warping engine). For example, the weights are updated so that they change in the opposite direction of the gradient. The weight update is denoted as $$w = w_i - \eta \frac{dL}{dW},$$

where w denotes a weight, $w_i$ denotes the initial weight, and $\eta$ denotes a learning rate. The learning rate is set to any suitable value, with a high learning rate including larger weight updates and a lower value indicating smaller weight updates.

In an embodiment, if the loss for the warped image does not pass the one or more threshold criteria, the warped image generator updates, at block 712, the one or more models (e.g., perceiver network, upsampling system, and/or warping engine) as described above. Further, using these updated one or more models, the warped image generator evaluates the resulting warped images to determine a new loss for the image and determine whether this loss passes the one or more threshold criteria. Thus, through this iterative process, the warped image generator trains the perceiver network, upsampling system, and warping engine to generate a warped image that closely mimics the warping performed by the artist.

In an embodiment, if the warped image generator determines that the loss for the resulting warped image satisfies the one or more loss threshold criteria, the warped image generator implements, at block 714, the one or more machine learning models (e.g., perceiver network, upsampling system, warping engine, etc.) for the processing of input images that are used to generate warped images. Thus, the warped image generator is utilized to process incoming images to generate warped images that are stylized using any desired stylization network, such as CartoonGAN.

FIG. 8 is a flowchart illustrating an example of a process 800 for generating warped images using one or more of the techniques described herein. At block 802, the process 800 includes obtaining a digital image of an object. In some examples, the digital image includes a digital representation of a human face or other object.

At block 804, the process 800 includes generating a warping field using a trained model with the digital image as input. For instance, the warping field includes a set of values representing displacements in one or more directions. The trained model is trained (to generate one or more warping fields) with pairings of training images and known warped images using supervised learning techniques and one or more losses. In some implementations, the known warped images are manually warped using an image manipulation application. In some cases, as previously described, the one or more losses include a warp loss determined based on differences between one or more first warping fields generated using the known warped images and one or more second warping fields generated using the training images. In some cases, the one or more losses include a cosine similarity regularization loss determined based on displacements obtained from warping fields generated using the training images. In some cases, the one or more losses include a reconstruction loss that penalizes a distance between warped images generated using the trained model based on the training images and the known warped images.

At block 806, the process 800 includes determining, using the warping field, a set of displacements associated with pixels of the digital image. The set of displacements indicate pixel displacement directions for the pixels of the digital image. In some examples, the process 800 includes upsampling the warping field to obtain the displacements.

At block 808, the process 800 includes applying the set of displacements to the digital image to generate a warped image of the object. In some examples, the process 800 performs interpolation to apply the set of displacements to the digital image to generate a warped image of the object. For instance, the process 800 performs interpolation of the set of values representing displacements in the one or more directions to generate the warped image. In one illustrative example, the process 800 includes using bilinear interpolation to apply the set of displacements to the object. In some implementations, the process 800 includes applying a scaling factor to the warping field to adjust an intensity of warping of the digital image. For example, as described above, the warping field is multiplied by a scaling factor $\alpha$ to control the intensity of the warp. The scaling factor $\alpha$ is selected as described above with respect to FIG. 5.

In some examples, the process 800 includes receiving the warped image as input to a stylization network, and generating a stylized warped image using the stylization network and the warped image. For instance, the process 800 includes generating, using the warped image as input to the stylization network, a new image that includes a stylized caricature of the object (e.g., the human face).

As described above, the machine learning model is trained using the one or more losses. In some cases, a set of input images and a set of known warped images is obtained. The set of known warped images are generated using the set of input images. Using the set of input images, a set of warping fields corresponding to the set of input images is generated. The set of warping fields is applied to the set of input images to obtain a set of warped images. The machine learning model is trained, at least in part, based on differences between the set of warped images and the set of known warped images.

Figure 9:
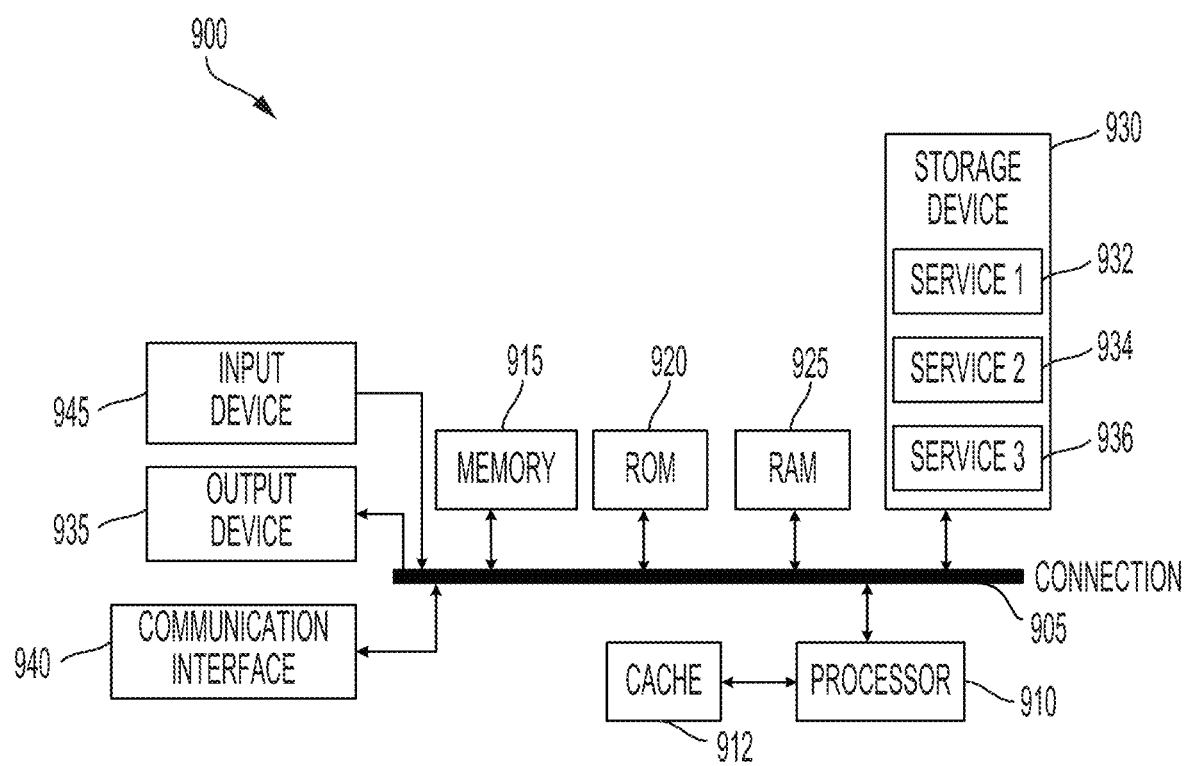
FIG. 9 is an example computing device architecture of an example computing device that implements the various techniques described herein.

In some examples, the processes described herein (e.g., process 600, process 700, process 800, or other process described herein) are performed by a computing device or apparatus, such as a computing device having the computing device architecture 900 shown in FIG. 9. In some examples, the computing device includes the computing device architecture 900 and implements the warped image generator 122 of FIG. 1. The computing device includes any suitable device, such as a mobile device (e.g., a mobile phone), a desktop computing device, a tablet computing device, a wearable device, a server (e.g., in a software as a service (SaaS) system or other server-based system), and/or any other computing device with the resource capabilities to perform the processes described herein, including processes 600, 700, and 800. In some cases, the computing device or apparatus includes various components, such as one or more input devices, one or more output devices, one or more processors, one or more microprocessors, one or more microcomputers, and/or other component that is configured to carry out the steps of processes described herein. In some examples, the computing device includes a display (as an example of the output device or in addition to the output device), a network interface configured to communicate and/or receive the data, any combination thereof, and/or other component(s). The network interface is configured to communicate and/or receive Internet Protocol (IP) based data or other type of data.

The components of the computing device are implemented in circuitry. For example, the components include and/or are implemented using electronic circuits or other electronic hardware, which include one or more programmable electronic circuits (e.g., microprocessors, graphics processing units (GPUs), digital signal processors (DSPs), central processing units (CPUs), and/or other suitable electronic circuits), and/or include and/or are implemented using computer software, firmware, or any combination thereof, to perform the various operations described herein.

Process 600, process 700, and process 800 are illustrated as logical flow diagrams, the operation of which represent a sequence of operations that are implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations are combined in any order and/or in parallel to implement the processes.

Additionally, the processes described herein (including process 600, process 700, and process 800) are performed under the control of one or more computer systems configured with executable instructions and are implemented as code (e.g., executable instructions, one or more computer programs, or one or more applications) executing collectively on one or more processors, by hardware, or combinations thereof. As noted above, the code is stored on a computer-readable or machine-readable storage medium, for example, in the form of a computer program comprising a plurality of instructions executable by one or more processors. The computer-readable or machine-readable storage medium is non-transitory.

FIG. 9 illustrates an example computing device architecture 900 of an example computing device which implements the various techniques described herein. For example, the computing device architecture 900 implements the warped image generator 304 shown in FIG. 3 and/or any of the processes described herein (including processes 600, 700, and 800). The components of computing device architecture 900 are shown in electrical communication with each other using connection 905, such as a bus. The example computing device architecture 900 includes a processing unit (CPU or processor) 910 and computing device connection 905 that couples various computing device components including computing device memory 915, such as read only memory (ROM) 920 and random access memory (RAM) 925, to processor 910.

Computing device architecture 900 includes a cache of high-speed memory connected directly with, in close proximity to, or integrated as part of processor 910. Computing device architecture 900 copies data from memory 915 and/or the storage device 930 to cache 912 for quick access by processor 910. In this way, the cache provides a performance boost that avoids processor 910 delays while waiting for data. These and other modules control or are configured to control processor 910 to perform various actions. Other computing device memory 915 may be available for use as well. Memory 915 includes multiple different types of memory with different performance characteristics. Processor 910 includes any general purpose processor and a hardware or software service, such as service 1 932, service 2 934, and service 3 936 stored in storage device 930, configured to control processor 910 as well as a special-purpose processor where software instructions are incorporated into the processor design. Processor 910 is a self-contained system, containing multiple cores or processors, a bus, memory controller, cache, etc. A multi-core processor is symmetric or asymmetric.

To enable user interaction with the computing device architecture 900, input device 945 represents any number of input mechanisms, such as a microphone for speech, a touch-sensitive screen for gesture or graphical input, keyboard, mouse, motion input, speech and so forth. Output device 935, in some examples, is one or more of a number of output mechanisms known to those of skill in the art, such as a display, projector, television, speaker device, etc. In some instances, multimodal computing devices enable a user to provide multiple types of input to communicate with computing device architecture 900. Communication interface 940 generally governs and manages the user input and computing device output. There is no restriction on operating on any particular hardware arrangement and therefore the basic features here may easily be substituted for improved hardware or firmware arrangements as they are developed.

Storage device 930 is a non-volatile memory and is a hard disk or other types of computer readable media which store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 includes services 932, 934, 936 for controlling processor 910. Other hardware or software modules are contemplated. Storage device 930 is connected to the computing device connection 905. In one aspect, a hardware module that performs a particular function includes the software component stored in a computer-readable medium in connection with the necessary hardware components, such as processor 910, connection 905, output device 935, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium includes a non-transitory medium in which data is stored and that does not include carrier waves and/or transitory electronic signals propagating wirelessly or over wired connections. Examples of a non-transitory medium includes, but are not limited to, a magnetic disk or tape, optical storage media such as compact disk (CD) or digital versatile disk (DVD), flash memory, memory or memory devices. A computer-readable medium has stored thereon code and/or machine-executable instructions that represent a procedure, a function, a subprogram, a program, a routine, a subroutine, a module, a software package, a class, or any combination of instructions, data structures, or program statements. A code segment is coupled to another code segment or a hardware circuit by passing and/or receiving information, data, arguments, parameters, or memory contents. Information, arguments, parameters, data, etc. are passed, forwarded, or transmitted via any suitable means including memory sharing, message passing, token passing, network transmission, or the like.

In some embodiments the computer-readable storage devices, mediums, and memories include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, operations or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations are performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination corresponds to a return of the function to the calling function or the main function.

Processes and methods according to the above-described examples are implemented using computer-executable instructions that are stored or otherwise available from computer-readable media. Such instructions include, for example, instructions and data which cause or otherwise configure a general purpose computer, special purpose computer, or a processing device to perform a certain function or group of functions. Portions of computer resources used are accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures include hardware, software, firmware, middleware, microcode, hardware description languages, or any combination thereof, and take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also is embodied in peripherals or add-in cards. Such functionality is implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments are utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm operations described in connection with the embodiments disclosed herein may be implemented as electronic hardware, computer software, firmware, or combinations thereof. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of generating warped images, comprising:
obtaining, by a perceiver network, a digital image, wherein the digital image is of an object;
generating, by the perceiver network, a warping field using a trained model with the digital image as input, the trained model being trained to generate one or more warping fields with pairings of training images and known warped images using supervised learning techniques and one or more losses, wherein the trained model is a neural network that produces a channel descriptor of the digital image by aggregating feature maps across spatial dimensions and uses the channel descriptor to produce per-channel modulation weights, wherein the one or more warping fields are generated based on the per-channel modulation weights and the feature maps;
determining, by a warping engine using the warping field, a set of displacements associated with pixels of the digital image, the set of displacements indicating pixel displacement directions for the pixels of the digital image; and
applying, by the warping engine, the set of displacements to the digital image to generate a warped image of the object.

2. The method of claim 1, further comprising using bilinear interpolation to apply the set of displacements to the object.

3. The method of claim 1, wherein the one or more losses include a warp loss determined based on differences between one or more first warping fields generated using the known warped images and one or more second warping fields generated using the training images.

4. The method of claim 1, wherein the one or more losses include a cosine similarity regularization loss determined based on displacements obtained from warping fields generated using the training images.

5. The method of claim 1, wherein the one or more losses include a reconstruction loss that penalizes a distance between warped images generated using the trained model based on the training images and the known warped images.

6. The method of claim 1, further comprising:
receiving, as input to a stylization network, the warped image; and
generating, using the stylization network and the warped image, a stylized warped image.

7. The method of claim 1, further comprising applying a scaling factor to the warping field to adjust an intensity of warping of the digital image.

8. A system for generating a warped image, comprising:
a perceiver network to:
obtain a digital image, wherein the digital image includes a digital representation of a human face; and
generate a warping field using the digital image, wherein the warping field includes a set of values representing displacements in one or more directions, wherein the perceiver network is a neural network trained to generate the warping field based on per-channel modulation weights and feature maps; and
a warping engine to:
determine, based on the set of values of the warping field, the displacements in the one or more directions; and
apply the displacements to the digital representation of the human face to generate the warped image.

9. The system of claim 8, wherein the warping field is generated using a model trained with pairings of training images and known warped images using supervised learning techniques and one or more losses.

10. The system of claim 9, wherein the one or more losses include a warp loss determined based on differences between one or more first warping fields generated using the known warped images and one or more second warping fields generated using the training images.

11. The system of claim 9, wherein the one or more losses include a regularization loss determined based on displacements obtained from one or more warping fields generated using the training images.

12. The system of claim 8, further comprising an upsampling system that causes the system to upsample the warping field to obtain the displacements.

13. The system of claim 8, further comprising a stylization network that causes the system to generate, using the warped image as input, a new image that includes a stylized caricature of the human face.

14. The system of claim 8, wherein the warping engine further causes the system to perform interpolation of the set of values to apply the displacements to the digital representation of the human face.

15. The system of claim 8, wherein the warping engine further causes the system to use bilinear interpolation to apply the set of displacements to the digital representation of the human face.

16. A non-transitory computer-readable storage medium having stored thereon instructions that, when executed by one or more processors, cause the one or more processors to:
obtain, using a warped image generator, a set of input images, wherein the set of input images includes digital representations of human faces;
obtain, using the warped image generator, a set of known warped images, wherein the set of known warped images is generated using the set of input images;
generate, using the warped image generator and the set of input images, a set of warping fields corresponding to the set of input images;
apply, using the warped image generator, the set of warping fields to the set of input images to obtain a set of warped images; and
train a neural network of the warped image generator based on differences between the set of warped images and the set of known warped images using a first loss function calculated before the set of warping fields are applied to the set of input images and a second loss function calculated after the set of warping fields are applied to the set of input images, wherein the neural network of the warped image generator is trained to generate warping fields for creating warped images based on received input images.

17. The non-transitory computer-readable storage medium of claim 16, wherein the neural network of the warped image generator is trained using supervised learning techniques.

18. The non-transitory computer-readable storage medium of claim 16, wherein the set of known warped images are manually warped using an image manipulation application.

19. The non-transitory computer-readable storage medium of claim 16, wherein the instructions further cause the one or more processors to upsample the set of warping fields to obtain pixel displacements for the set of input images.

20. The non-transitory computer-readable storage medium of claim 16, wherein the instructions further cause the one or more processors to determine a warp loss based on differences between the set of warping fields corresponding to the set of input images and an additional set of warping fields generated using the set of known warped images, wherein the warp loss is used to train the neural network.

* * * * *